(12) United States Patent
Nakama et al.

(10) Patent No.: US 9,429,717 B2
(45) Date of Patent: *Aug. 30, 2016

(54) FERRULE AND FERRULE WITH OPTICAL FIBER

(71) Applicant: FUJIKURA LTD., Kohtoh-ku, Tokyo (JP)

(72) Inventors: Akihiro Nakama, Sakura (JP); Tatsuya Ohta, Sakura (JP); Akito Nishimura, Sakura (JP); Terutake Kobayashi, Sakura (JP); Kunihiko Fujiwara, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,365

(22) Filed: Mar. 25, 2015

(65) Prior Publication Data

US 2015/0198771 A1 Jul. 16, 2015

Related U.S. Application Data

(63) Continuation-in-part of application No. 12/878,502, filed on Sep. 9, 2010, now Pat. No. 9,063,304.

(30) Foreign Application Priority Data

Jun. 29, 2010 (JP) .................................. 2010-148288

(51) Int. Cl.
*G02B 6/26* (2006.01)
*G02B 6/36* (2006.01)
(Continued)

(52) U.S. Cl.
CPC ............ *G02B 6/3861* (2013.01); *G02B 6/4214* (2013.01); *G02B 6/3636* (2013.01); *G02B 6/4206* (2013.01); *G02B 6/4239* (2013.01); *G02B 6/4284* (2013.01); *G02B 6/4292* (2013.01)

(58) Field of Classification Search
CPC .. G02B 6/262; G02B 6/3836; G02B 6/3861; G02B 6/42; G02B 6/4201; G02B 6/4206; G02B 6/4214; G02B 6/4248; G02B 6/4284
USPC ......... 385/15, 31–33, 38–39, 49, 51, 65, 80, 385/83, 86, 88, 92
See application file for complete search history.

(56) References Cited

U.S. PATENT DOCUMENTS 6,409,394 B1  6/2002  Ueda et al.
6,491,447 B2  12/2002  Aihara
(Continued)

FOREIGN PATENT DOCUMENTS

CN  101206283 A  6/2008
JP  2001-051162 A  2/2001
(Continued)

OTHER PUBLICATIONS

Japanese Office Action, dated Jun. 18, 2013, issued in corresponding Japanese Patent Application No. 2010-148288.
(Continued)

*Primary Examiner* — Akm Enayet Ullah
*Assistant Examiner* — Michael Mooney
(74) *Attorney, Agent, or Firm* — Sughrue Mion, PLLC

(57) ABSTRACT

A ferrule of the present invention includes a positioning mechanism for positioning an optical fiber, and a recess having at least a first inner wall for allowing a front end of the optical fiber portion positioned by the positioning mechanism to protrude, and a second inner wall opposite to the first inner wall. A distance between the first inner wall and the second inner wall is less than or equal to four times the outer diameter of the optical fiber. Adhesive is filled into the recess and cured in a state in which the optical fiber protrudes from the first inner wall and substantially contacts the second inner wall to fix the optical fiber.

4 Claims, 9 Drawing Sheets

(51) Int. Cl.
*G02B 6/42* (2006.01)
*G02B 6/38* (2006.01)

(56) References Cited

U.S. PATENT DOCUMENTS

| | | | |
|---|---|---|---|
| 9,063,304 B2 * | 6/2015 | Ohta et al. | 385/38 |
| 2001/0053266 A1 | 12/2001 | Suematsu et al. | |
| 2008/0144999 A1 * | 6/2008 | Takeda et al. | 385/51 |
| 2009/0252455 A1 | 10/2009 | Ohta et al. | |
| 2011/0317959 A1 * | 12/2011 | Ohta et al. | 385/38 |
| 2012/0183269 A1 | 7/2012 | Ohta et al. | |

FOREIGN PATENT DOCUMENTS

| | | |
|---|---|---|
| JP | 2003-140002 A | 5/2003 |
| JP | 2006-162806 A | 6/2006 |
| JP | 2008-151843 A | 7/2008 |
| JP | 2009-104096 A | 5/2009 |

OTHER PUBLICATIONS

Japanese Office Action issued in Japanese Application No. 2010-148288 dated Oct. 1, 2013.

Japanese Information Statement issued in Japanese Application No. 2010-148288 dated Oct. 29, 2013.

Chinese Office Action, dated Mar. 5, 2014, issued in Chinese Patent Application No. 201010529744.4.

Communication dated Jan. 16, 2015, issued by the State Intellectual Property Office of P.R. China in counterpart Chinese application No. 201010529744.4.

Communication dated May 20, 2014, issued by the Japanese Patent Office in counterpart Japanese application No. 2010-148288.

Office Action issued by U.S. Patent Office in U.S. Appl. No. 12/878,502 dated Nov. 26, 2012.

Office Action issued by U.S. Patent Office in U.S. Appl. No. 12/878,502 dated Oct. 2, 2014.

* cited by examiner

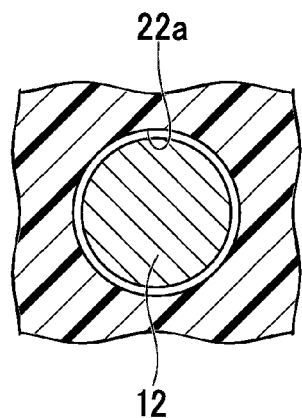
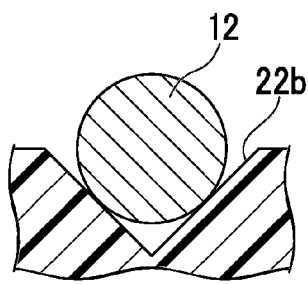
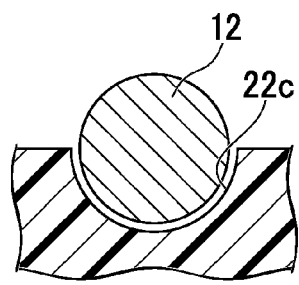
FIG. 10A  FIG. 10B  FIG. 10C
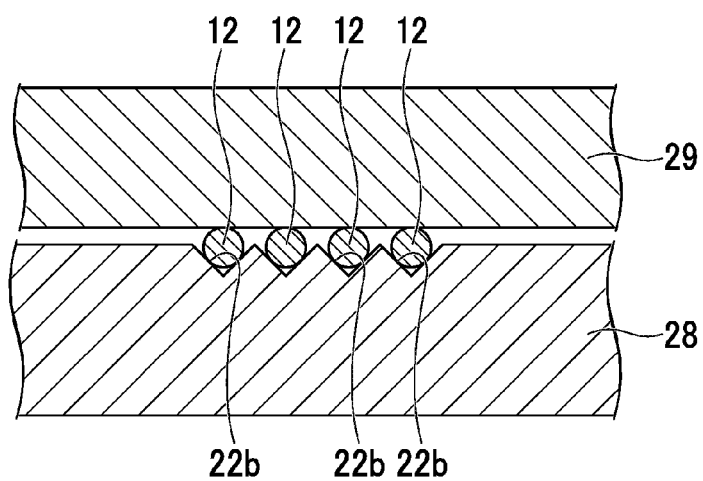
FIG. 11

FERRULE AND FERRULE WITH OPTICAL FIBER

CROSS REFERENCE TO RELATED APPLICATIONS

This application is a continuation-in-part of U.S. patent application of Ser. No. 12/878,502, filed on Sep. 9, 2010, whose priority is claimed on Japanese Patent Application No. 2010-148288 filed on Jun. 29, 2010, the contents of which are incorporated herein by reference.

BACKGROUND OF THE INVENTION

1. Field of the Invention

The present invention relates to a ferrule mounted to a front end of an optical fiber in order to optically connect the optical fiber with an optical part, such as an optical element on a board or a module or an optical fiber mounted on another connector and to a ferrule with an optical fiber.

2. Description of the Related Art

In recent years, a scheme of fixing an optical fiber so that an optical element, such as a light emitting element (e.g., a semiconductor laser) or a light receiving element (e.g., a photo diode) mounted on a board is optically connected with the optical fiber wired along the board and having an optical connector assembled with a front end thereof has been widely used.

When the optical fiber is optically connected with an optical element or another optical fiber, deviation of an axial direction of the optical fiber increases connection loss. Accordingly, it is necessary to position an axis of the optical fiber in order to prevent the increase of the connection loss.

For example, an optical path changing member having an optical-fiber insertion hole into which an optical fiber is inserted, and a front-end arrangement space communicating with the optical fiber insertion hole is described in Japanese Unexamined Patent Application, First Publication No. 2009-104096. In the optical path changing member, a front end of the optical fiber is disposed in the front-end arrangement space, which is filled with adhesive to fix the optical fiber to a predetermined position.

Thus, as in the case that an intermediate portion of the optical fiber (an optical fiber portion disposed in the insertion hole) is positioned and the front end of the optical fiber is disposed in the front-end arrangement space to adhere and fix the optical fiber, the adhesive is shrunk when cured, and thus force is applied to the optical fiber in the front-end arrangement space in the lateral direction. As a result, the front end portion of the optical fiber moves and an output direction deviates. Even when a positioning mechanism for positioning the front end of the optical fiber is formed in a ferrule in order to avoid such a problem, it is necessary to precisely match positions of the positioning mechanism for positioning the front end portion and a positioning mechanism for positioning the intermediate portion, making it difficult to mold the ferrule.

The present invention has been achieved in view of the above circumstances, and it is an object of the present invention to provide a ferrule capable of being easily molded and reducing a deviation of an output direction.

SUMMARY OF THE INVENTION

A ferrule according to an embodiment of the present invention is mounted to a front end of an optical fiber for optically connecting the optical fiber to another optical part. The ferrule includes: a positioning mechanism for positioning an intermediate portion of the optical fiber; and a recess having at least a first inner wall for allowing the front end of the optical fiber portion positioned by the positioning mechanism to protrude, and a second inner wall opposite to the first inner wall. The distance between the first inner wall and the second inner wall is less than or equal to four times the outer diameter of the optical fiber. Adhesive is filled into the recess and cured in a state in which the optical fiber protrudes from the first inner wall and substantially contacts the second inner wall to fix the optical fiber.

The ferrule may be a resin that is transparent to a used wavelength.

The recess may have an adhesive application slot with an opening larger than the distance between the first inner wall and the second inner wall.

The adhesive application slot may have an inclined surface at least one of the first inner wall and the second inner wall.

The ferrule may further include a reflecting portion for changing an optical path between the front end of the optical fiber positioned by the positioning mechanism and the other optical part.

In a ferrule with an optical fiber according to an embodiment of the present invention, the optical fiber is fixed to the ferrule.

An optical connector according to an embodiment of the present invention includes the ferrule.

A ferrule according to an embodiment of the present invention is a ferrule for optically connecting an optical fiber to an optical part, and the ferrule includes a boot accommodating hole which is configured to accommodate a boot attached to the optical fiber and which is formed on a rear end surface of the ferrule, an optical fiber hole which is configured to position an intermediate portion of the optical fiber having a predetermined outer diameter and which extends forward from a front end of the boot accommodating hole, and a recess configured for an adhesive to be disposed therein and comprising a first inner wall from which a front end of the optical fiber positioned by the optical fiber hole is protrudable, and a second inner wall opposite to the first inner wall. The second inner wall is configured to be abutted by almost an entire area of a front end surface of the optical fiber, a bottom of the recess is positioned lower than a lower edge of the front end of the optical fiber that protruded from the first inner wall, the recess comprises an adhesive application slot with an opening larger than the distance between the first inner wall and the second inner wall, the first inner wall comprising a first inclined surface, and the second inner wall comprising a second inclined surface which does not reach a front face of the ferrule, and a distance between the first inner wall and the second inner wall is more than or equal to half of the outer diameter of the optical fiber and less than or equal to four times the outer diameter of the optical fiber.

In addition, the ferrule may be formed of a resin that is transparent to a wavelength of light transmitted through the optical fiber.

The ferrule may further comprises a reflecting portion reflecting light on an optical path between the front end of the optical fiber positioned by the optical fiber hole and the optical part.

Moreover, an optical connector for optically connecting an optical fiber to an optical part according to an embodiment of the present invention includes an optical fiber and a ferrule. The ferrule includes a boot accommodating hole which is configured to accommodate a boot attached to the optical fiber and which is formed on a rear end surface of the ferrule, an optical fiber hole which is configured to position at least an intermediate portion of the optical fiber and which extends forward from a front end of the boot accommodating hole, a recess comprising a first inner wall from which a front end of the optical fiber protrudes, and a second inner wall opposite to the first inner wall, and an adhesive disposed in the recess and a surrounding portion of the optical fiber protruding from the first inner wall. A bottom of the recess is positioned lower than a lower edge of the front end of the optical fiber that protruded from the first inner wall, the recess comprises an adhesive application slot with an opening larger than the distance between the first inner wall and the second inner wall, the first inner wall comprising a first inclined surface, and the second inner wall comprising a second inclined surface which does not reach a front face of the ferrule, a distance between the first inner wall and the second inner wall is more than or equal to half of the outer diameter of the optical fiber and less than or equal to four times the outer diameter of the optical fiber, and substantially an entire area of a front end surface of the optical fiber abuts the second inner wall.

In the ferrule, a plurality of the optical fibers may be fixed, and the reflecting portion may include a recessed reflecting surface and may be provided to each of the plurality of the optical fibers.

In the ferrule, a plurality of the reflecting portions may be arranged in an arrangement direction of the plurality of the optical fibers.

In addition, the ferrule may include a lens located on an extension line of the optical fiber.

Moreover, in the optical connector, the ferrule may include a lens located on an extension line of the optical fiber.

BRIEF DESCRIPTION OF THE DRAWINGS

FIG. 10A is a cross-sectional view showing an example of an optical fiber hole.

FIG. 10B is a cross-sectional view showing an example of a V-shaped groove;

FIG. 10C is a cross-sectional view showing an example of a U-shaped groove;

FIG. 11 is a cross-sectional view showing an example of a ferrule including a body with a V-shaped groove and a pressing lid.

DETAILED DESCRIPTION OF THE PREFERRED EMBODIMENTS

Hereinafter, embodiments of the present invention will be described with reference to the accompanying drawings.

Figure 1A:
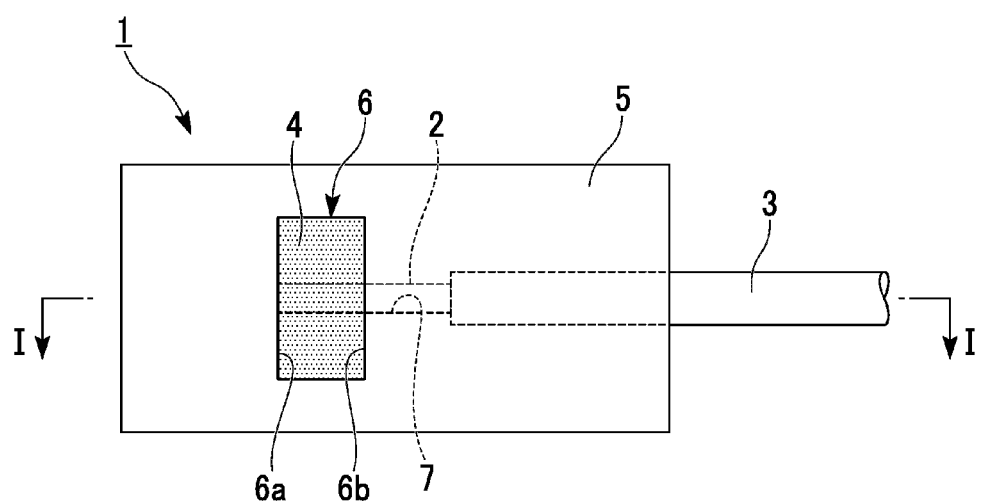
FIG. 1A is a plan view showing a ferrule with an optical fiber according to an embodiment of the present invention.
Figure 1B:
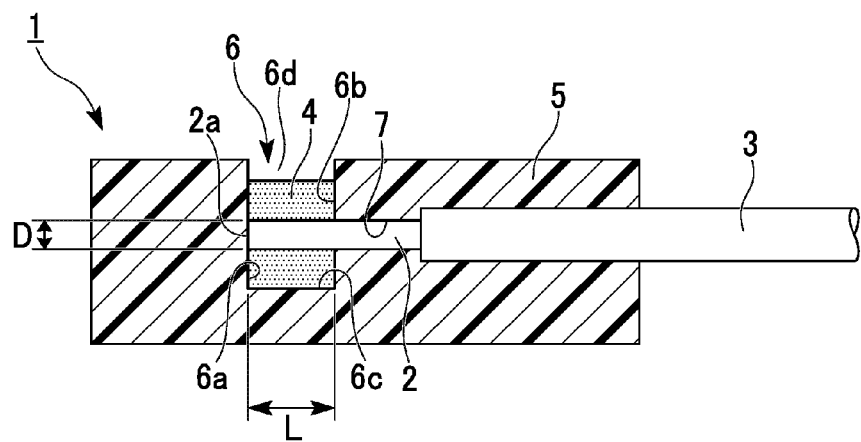
FIG. 1B is a cross-sectional view of the ferrule with an optical fiber taken along a line I-I of FIG. 1A according to the embodiment.

As shown in FIGS. 1A and 1B, a ferrule 1 of the present embodiment is mounted to a front end of an optical fiber 2 and used to optically connect the optical fiber 2 with another optical part. This ferrule 1 has a positioning mechanism 7 for positioning an intermediate portion of the optical fiber 2, and a recess 6. This recess 6 has a first inner wall 6b for allowing a front end portion of the optical fiber 2 positioned by the positioning mechanism 7 to protrude, and a second inner wall 6a opposite to the first inner wall 6b. In the ferrule 1, adhesive 4 is filled into the recess 6 and cured to fix the optical fiber 2 in a state in which the optical fiber 2 protrudes from the first inner wall 6b and the front end of the optical fiber 2 substantially contacts the second inner wall 6a.

This ferrule 1 may be used as a ferrule for an optical connector. The optical connector includes a ferrule 1, and a structure (e.g., a housing, a latch, a screw, a spring, an arm, or an engagement pin) for mechanically connecting the ferrule 1 to another optical part, or a board or a module having the other optical part mounted thereon.

The optical fiber 2 is, for example, an optical fiber core wire, a single-core optical fiber core wire led at a front end of a multi-core optical fiber tape core wire, an optical fiber strand, or a bare optical fiber. In the example shown in FIG. 1B, an optical fiber 2 has a coating 3 provided therearound. The coating 3 is removed (led) from the front end portion of the optical fiber 2 disposed in the positioning mechanism 7 and the recess 6. In this disclosure, the optical fiber portion which is disposed in the positioning mechanism 7 and from which the coating 3 has been removed is referred to as an intermediate portion of the optical fiber 2. It is preferable that a front end face 2a of the optical fiber 2 is formed perpendicular to a longitudinal direction of the optical fiber 2.

The type of the optical fiber is not particularly limited, and may be any of a silica optical fiber, a plastic optical fiber, a multi-mode optical fiber, a single-mode optical fiber or the like.

Examples of the positioning mechanism 7 for positioning the intermediate portion of the optical fiber 2 include an optical fiber hole 22a shown in FIG. 10A, a V-shaped groove 22b shown in FIG. 10B, and a U-shaped groove 22c shown in FIG. 10C. FIGS. 10A to 10C show cross-sectional surfaces perpendicular to the longitudinal directions of the positioning mechanism 7 and the optical fiber 12.

The ferrule 1 may be a single-core ferrule to which one optical fiber is mounted or a multi-core ferrule to which two or more optical fibers are mounted. The positioning mechanism 7 has an opening at the first inner wall 6b so that the optical fiber 2 can protrude into the recess 6. When the optical fiber 2 is inserted into the positioning mechanism 7, gas such as air inside the positioning mechanism 7 is discharged into the recess 6. This allows the optical fiber 2 to be smoothly inserted even when a difference between an inner diameter of the optical fiber hole 22a and an outer diameter of the optical fiber 2 is small.

In the present embodiment, the ferrule 1 includes a ferrule body 5 integrally molded using a transparent material. The ferrule body 5 may be formed of transparent resin, such as polycarbonate, modified polyolefin, epoxy resin, and polyetherimide (PEI).

The ferrule body 5 may be manufactured, for example, using resin molding such as injection molding. The shape of the ferrule body 5 is not particularly limited. For example, the shape may be a flat cuboid or the like.

To optically connect the optical fiber 2 disposed in the recess 6 to another optical part, the second inner wall 6a may be transparent to a used wavelength at least in an adjacent portion opposite to the front end face 2a of the optical fiber 2. In this case, other portions of the ferrule body 5 may be formed of an opaque material. Further, light used for optical connection in the present invention is not limited to visible light. The light may be ultraviolet light or infrared light. The light may be any light having small connection loss allowed for actual use.

A reflective index of the material of the ferrule body 5 is not particularly limited. The reflective index of the material may be higher than, lower than, or equal to that of the optical fiber 2.

The recess 6 has an adhesive application slot 6d with an upper opening. When the adhesive 4 is filled from the adhesive application slot 6 into the recess 6 and cured, the optical fiber 2 is fixed to the recess 6 by the adhesive 4. The adhesive 4 may penetrate into the positioning mechanism 7. Accordingly, even in the positioning mechanism 7, the intermediate portion of the optical fiber 2 may be fixed to the ferrule 1.

It is preferable that the adhesive 4 is transparent to light and, particularly, has the same reflective index as the core of the optical fiber 2. It is preferable that the adhesive 4 has an excellent adhesion force with respect to the materials of the ferrule 1 and the optical fiber 2 which are the adherends. Specifically, the adhesive 4 includes thermoset epoxy adhesive, acrylic adhesive, or the like.

It is preferable that, prior to filling and curing of the adhesive 4, the front end face 2a of the optical fiber 2 contact (abut) the second inner wall 6a of the recess 6 in a state in which the front end face 2a of the optical fiber 2 is pressed into the second inner wall 6a of the recess 6, so that there is no clearance between the front end face 2a of the optical fiber 2 and the second inner wall 6a of the recess 6. When pressure is applied between the front end face 2a of the optical fiber 2 and the second inner wall 6a, the front end portion of the optical fiber 2 protruding from the first inner wall 6b is more stably held in the recess 6. In this case, it is unnecessary for the optical fiber 2 to contact a bottom portion 6c of the recess 6. When there is a clearance between the front end face 2a of the optical fiber 2 and the second inner wall 6a and the clearance is filled with the adhesive 4, the adhesive 4 functions as a reflective-index matching agent. Accordingly, it is possible to suppress light loss.

Since the cured adhesive obstructs movement of the optical fiber 2 after the optical fiber 2 is adhered and fixed, it does not matter that the optical fiber 2 is adhered and fixed in a state in which the front end face 2a of the optical fiber 2 contacts the second inner wall 6a or is close to the second inner wall 6a with a clearance therebetween. That is, it is preferable that the direction of the front end of the optical fiber 2 protruding from the first inner wall 6b to the recess 6 can be maintained and unchanged between an adhesive filling process and an adhesive curing process.

In the present embodiment, a distance L between the first inner wall 6b and the second inner wall 6a is less than or equal to four times the outer diameter D of the optical fiber 2. That is, the value of L/D is 4 or less (L/D≤4).

Figure 2A:
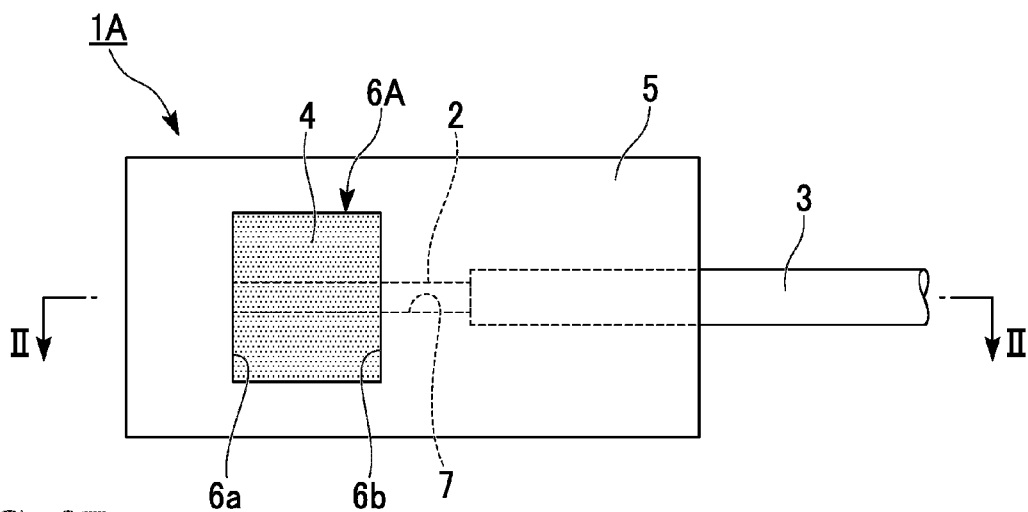
FIG. 2A is a plan view showing an example of a ferrule with an optical fiber in a comparative example.
Figure 2B:
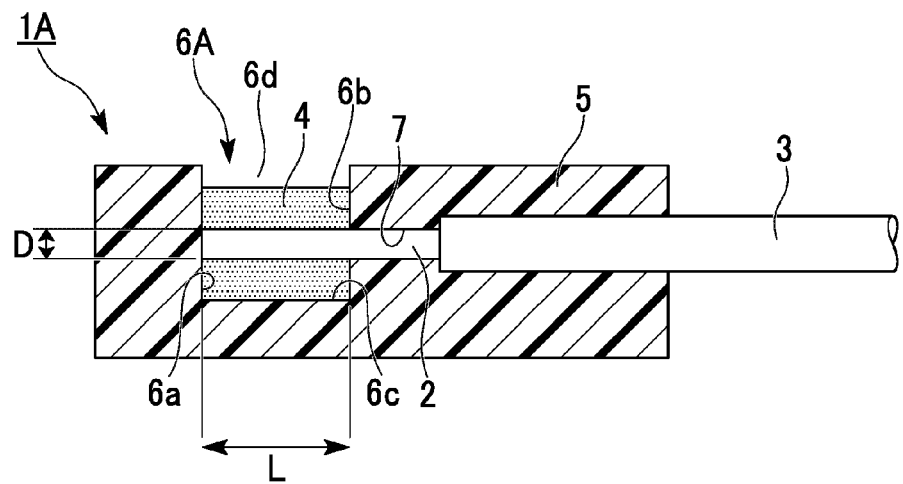
FIG. 2B is a cross-sectional view of the ferrule with an optical fiber taken along a line II-II of FIG. 2A in the comparative example.
Figure 3:
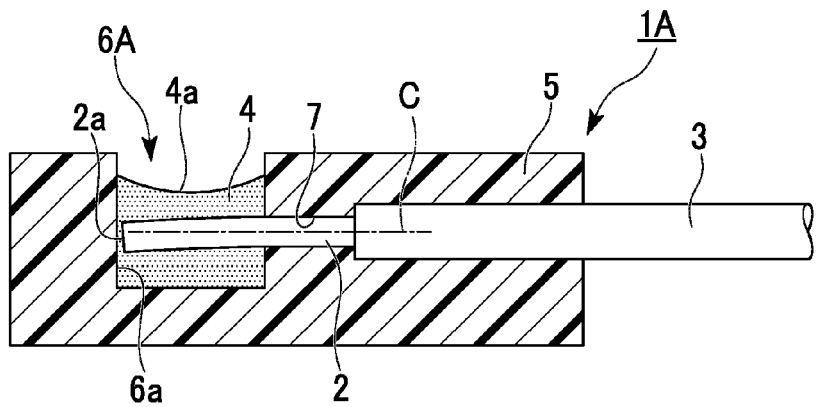
FIG. 3 is a diagram for explaining position deviation of an optical fiber due to shrinkage when adhesive is cured.

When the distance L between the first inner wall 6b and the second inner wall 6a in the recess 6A of the ferrule 1A is excessively greater than the outer diameter D of the optical fiber 2 as shown in FIG. 2, a shrinkage 4a of the adhesive 4 occurs when the adhesive 4 is cured, and the front end face 2a of the optical fiber 2 moves and deviates from a central axis C of the optical fiber 2 positioned by the positioning mechanism 7, as shown in FIG. 3. In this case, a deviation occurs in an output direction of light from the front end of the optical fiber 2 (or an input direction of light to the front end of the optical fiber 2), and making it difficult to match positions of optical fiber 2 when the optical fiber 2 is optically connected to another optical part. In particular, when the ferrule includes a member (not shown) for connection with a board or a module having the other optical part mounted thereon, the deviation of the output or input direction of the optical fiber 2 makes it difficult to change and adjust the direction of the entire ferrule.

As shown in FIG. 3, the shrinkage 4a of the adhesive 4 is larger in a central portion of the recess 6A in the longitudinal direction of the optical fiber 2 (a horizontal direction of the paper), and smaller at the inner walls 6a and 6b at both sides of the recess that are opposite to each other in the longitudinal direction. Such a phenomenon can be understood that the shrinkage 4a is suppressed by interaction between the adhesive 4 and the inner walls 6a and 6b. However, when L/D is great, the movement of the adhesive 4 occurs even in the vicinity of the second inner wall 6a due to the shrinkage 4a of the central portion. Moreover, a length of the optical fiber 2 protruding as a cantilever from the positioning mechanism 7 increases. Therefore, the front end portion of the optical fiber 2 is bent with failure of resistance against the movement of the adhesive 4. As a result, it is understood that the direction of the front end portion of the optical fiber 2 deviates.

On the other hand, as shown in FIGS. 1A and 1B, when L/D is 4 or less, the length of the optical fiber protruding from the positioning mechanism 7 is small. Therefore, by the rigidity of the optical fiber 2 itself, the movement of the front end portion of the optical fiber 2 caused by the shrinkage of the adhesive 4 is suppressed to a negligible level. As a result, the direction of the front end of the optical fiber 2 cannot deviate.

The lower limit of L/D is not particularly limited, and it is preferable that the distance L between the first inner wall 6b and the second inner wall 6a is secured to the extent that the adhesive 4 is allowed to be applied into the recess 6. For example, when the outer diameter D of the optical fiber 2 is 0.125 mm, it is preferable that L is about 0.06 mm or more and L/D is 0.5 or more.

When the shrinkage of the adhesive 4 increases, a movement amount of the front end portion of the optical fiber 2 increases. This tends to increase the deviation of the direction of the front end of the optical fiber 2. Therefore, it is preferable to use the adhesive 4 with a small shrinkage ratio. For example, it is preferable to use adhesive with a shrinkage ratio of 3 to 5% rather than adhesive with a shrinkage ratio of 5 to 10%. When the adhesive applied into the recess 6 of the ferrule 1 has a depth of Z before curing and a depth of Z–ΔZ after curing, the shrinkage ratio of the adhesive can be obtained using the following equation:

(shrinkage ratio of adhesive)=(shrinkage amount ΔZ)/(filling depth Z before adhesive is cured)× 100(%)

According to the ferrule 1 of the present embodiment, the deviation in the output (or input) direction of each optical fiber 2 becomes small. Accordingly, the ferrule 1 of the present embodiment is particularly suitable as a multi-core ferrule in which a plurality of optical fibers 2 are adhered and fixed.

In the case of the multi-core ferrule, when connection loss exceeds an allowable range at one of a plurality of optical fibers adhered and fixed to the ferrule, the ferrule with optical fibers is treated as a defective product. Therefore, when distinctly manufacture a ferrule with optical fibers in which connection loss of all the optical fibers is in the allowable range, the effect of the present invention that reduces the directional deviation of the front end of the optical fiber when a plurality of optical fibers are adhered and fixed to the ferrule is more prominent.

The ferrule 1 of the present embodiment has advantageous effect about its miniaturization because of its simple structure. For example, the size of the ferrule 1 is not particularly limited, but the ferrule 1, for example, may be 7 mm long or less and 7 mm wide or less.

(Modified Example of Ferrule)

Next, a ferrule 101 of a modified example will be described. The ferrule 101 of the modified example is different from the above-described ferrule 1 in that the ferrule 101 includes a lens 108. Identical reference numerals are used for the elements which are identical to those of the first embodiment, and the explanations thereof are omitted or simplified here.

Figure 14:
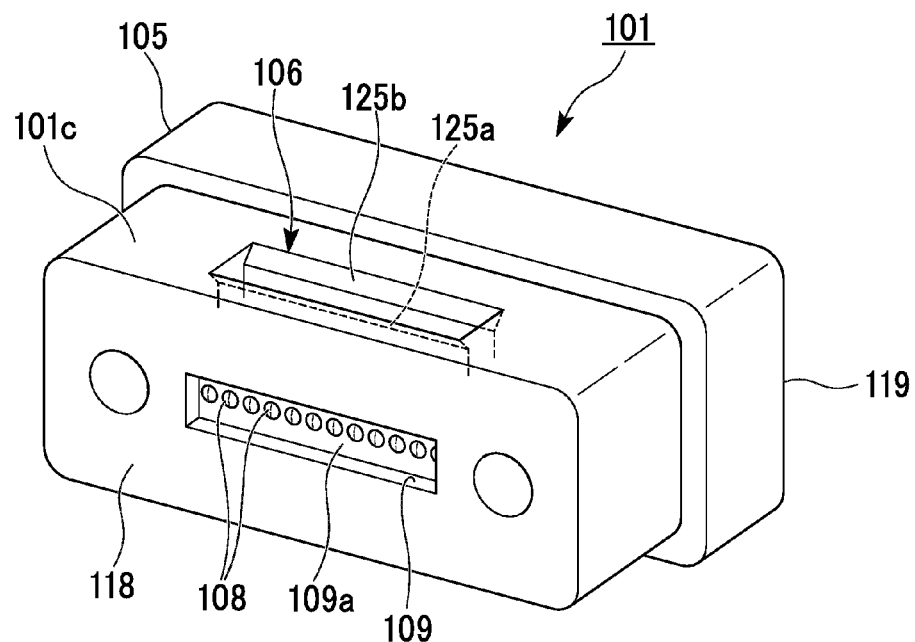
FIG. 14 is a perspective view showing a ferrule of a modified example.
Figure 15:
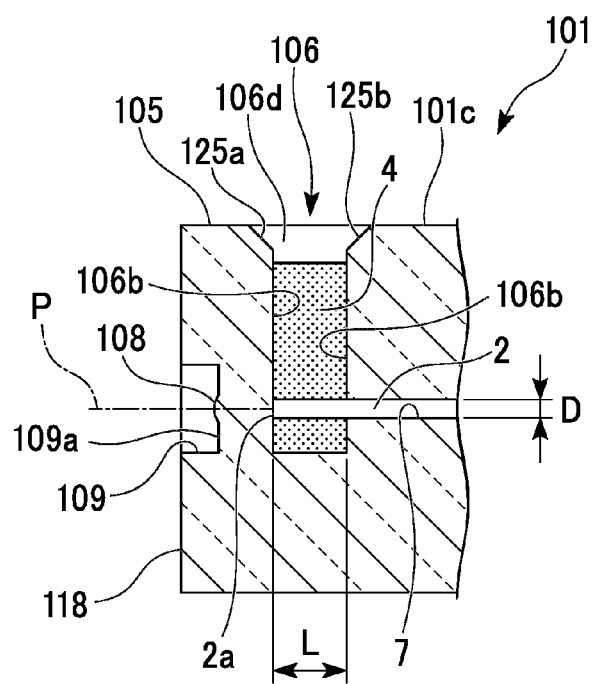
FIG. 15 is a cross-sectional view partially showing the ferrule shown in FIG. 14 into which the inserted optical fiber is inserted.

FIG. 14 is a perspective view showing the ferrule 101. FIG. 15 is a cross-sectional view partially showing the ferrule 101 into which the optical fiber 2 is to be inserted.

The ferrule 101 is formed of a ferrule body 105. The ferrule body 105 is a single member made of a resin material. As a resin material used to form the ferrule body 105, polyetherimide, polycarbonate, cyclic olefin copolymer, cyclic olefin polymer, or other transparent polymers may be adopted. Part of the ferrule body 105 which serves as an optical path from the optical fiber 2 to the lens 108 may be only formed of a transparent member.

As shown in FIG. 14, the ferrule 101 includes a front-end face (connection edge face) 118, a rear-end face 118, and a side surface 101c. The front-end face 118 is to be butt-jointed to a ferrule of the other optical connector (not shown in the figure). The rear-end face 119 is located on the opposite side of the front-end face 118. The front-end face 118 is located close to the front end face 2a of the optical fiber 2. The side surface 101c is located between the front-end face 118 and the rear-end face 119 of the ferrule 101.

As shown in FIG. 15, the ferrule 101 includes a positioning mechanism 7 which positions a center portion of the optical fiber 2. In the positioning mechanism 7, the optical fiber 2 is located. The optical fiber 2 is fixed to the positioning mechanism 7 by, for example, an adhesive.

A recess 106 is provided on the side surface 101c of the ferrule 101. The recess 106 is opened on the side surface 101c. The recess 106 is communicated with the positioning mechanism 7. The recess 106 is formed in a rectangular shape in a plan view. The recess 106 has a first inner wall 106b for allowing a front end portion of the optical fiber 2 positioned by the positioning mechanism 7 to protrude, and a second inner wall 106a opposite to the first inner wall 106b. The second inner wall 106a is positioned between the optical fiber 2 and the lens 108. The front end face 2a of the optical fiber 2 is brought into contact with the second inner wall 106a.

A distance L between the first inner wall 106b and the second inner wall 106a is less than or equal to four times the outer diameter D of the optical fiber 2. That is, the value of L/D is 4 or less (L/D≤4).

As shown in FIG. 15, the recess 106 is filled with an adhesive (refractive index matching material) 4. As a result, it is possible to prevent the front-end position of the optical fiber 2 from being displaced during use.

The ferrule 101 has inclined surfaces 125a and 125b, with an adhesive application slot 106d having an opening size increasing toward the side surface 101c, between inner walls 106a and 106b of a recess 106 and the side surface 101c. Accordingly, even when a distance L between the first inner wall 106b and the second inner wall 106a is small, the adhesive application slot 106d can have an increasing opening area above the recess 106. Accordingly, when the adhesive 4 is applied as drops from above the recess 106, the adhesive 4 easily enters the recess 106 through the adhesive application slot 106d.

A recess 109 is provided on the front-end face 118 of the ferrule 101. The recess 109 is depressed with respect to the front-end face 118. A plurality of lenses 108 are formed on the surface 109a that faces forward of the recess 109. The lenses 108 are accommodated in the recess 109 and do not protrude forward from the front-end face 118. The lenses 108 are located on the extension lines P of the inserted optical fibers 2. The lenses 108 are arranged to be optically aligned with corresponding optical fiber insertion holes (optical alignment).

The plurality of lenses 108 are molded integrally in one body which serves as part of the ferrule 101. The lenses 108 collimate light emitted from the front ends of the optical fibers 2. The lense 108 condenses, on the front end of the optical fiber 2, light emitted from the other ferrule that is butt-jointed to the ferrule 101. It is preferable that the focal point of the lens 108 be located on the second inner wall 106a.

Figure 4:
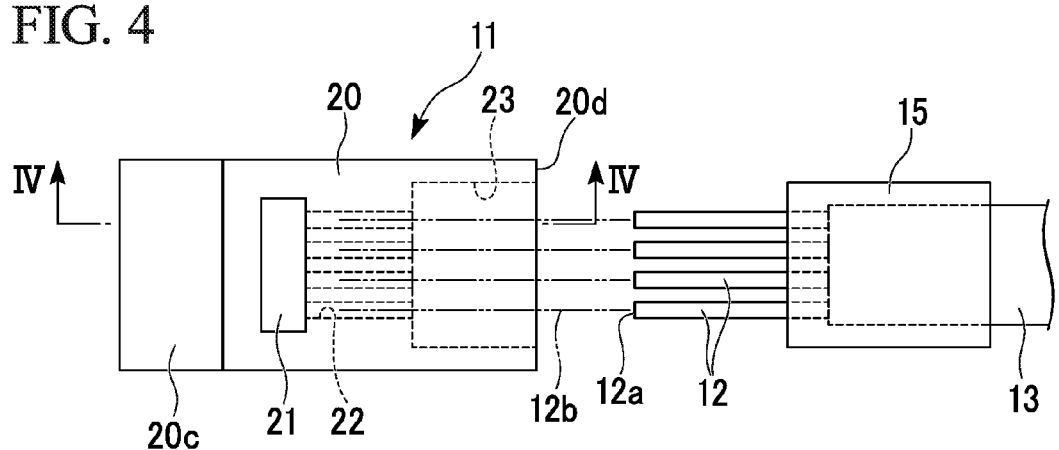
FIG. 4 is a plan view showing a ferrule according to another embodiment of the present invention.
Figure 5A:
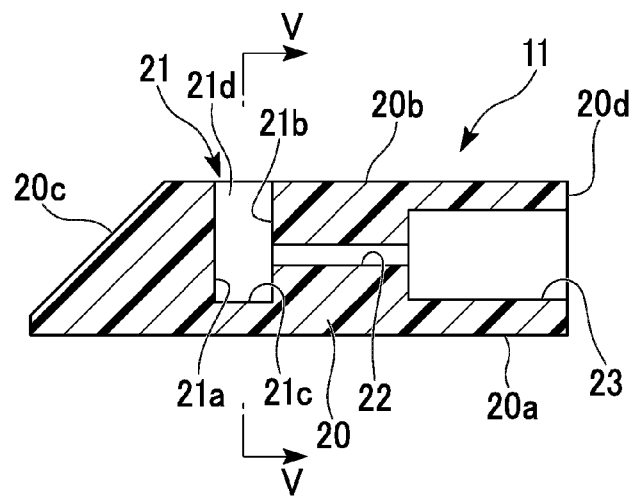
FIG. 5A is a cross-sectional view of a ferrule taken along a line IV-IV of FIG. 4 in the embodiment.
Figure 5B:
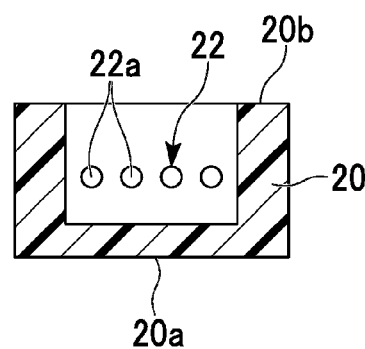
FIG. 5B is a cross-sectional view of a ferrule taken along a line V-V of FIG. 5A in the embodiment.
Figure 6:
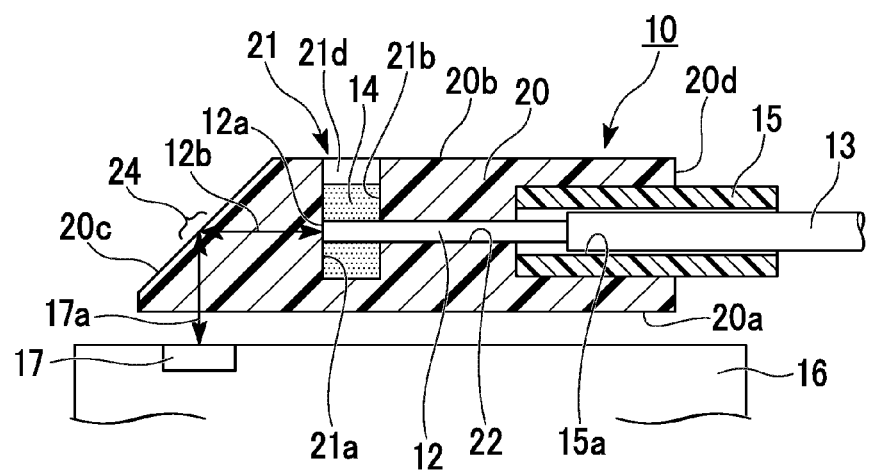
FIG. 6 is a cross-sectional view showing an example in which an optical fiber is optically connected with an optical element on a board using the ferrule shown in FIG. 4.

FIGS. 4 to 6 shows an example of a ferrule 11 that is suitable for an optical connector used for optical connection with an optical element 17 mounted on a photoelectric conversion module 16.

The ferrule 11 shown in FIG. 4 includes a ferrule body 20 comprising a positioning mechanism 22 for positioning an intermediate portion of an optical fiber 12, and a recess 21. This recess 21 has a first inner wall 21b for allowing a front end portion of the optical fiber 12 positioned by the positioning mechanism 22 to protrude, and a second inner wall 6a opposite to the first inner wall 21b.

As shown in FIGS. 5A and 5B, in the ferrule body 20, a lower surface 20a is a bonding surface opposite to the photoelectric conversion module 16, and the recess 21 is formed at an upper surface 20b opposite to the lower surface 20a. The optical fiber 12 protrudes from a first inner wall 21b, and adhesive 14 is filled into the recess 21 and cured in a state in which the optical fiber 12 substantially contacts a second inner wall 21a to fix the optical fiber 12.

In the present embodiment, a plurality of optical fibers 12 are collectively coated with one coating 13 to form a tape-shaped optical fiber core wire (fiber ribbon). The tape-shaped optical fiber core wire may be inserted into the ferrule 11 together with a boot 15, as shown in FIG. 4. A boot accommodating hole 23 is formed on a rear end surface 20d of the ferrule body 20, and when the optical fiber 12 is inserted into the positioning mechanism 22, the boot 15 is accommodated in the boot accommodating hole 23.

The boot 15 has a cross-sectional surface of a substantially rectangular cylindrical shape, and has a through hole 15a into which the optical fiber is inserted. The boot accommodating hole 23 has a greater cross-sectional area of an opening than the positioning mechanism 22. The boot accommodating hole 23 has substantially the same width and thickness as the boot 15. The boot 15 is engaged with the boot accommodating hole 23 by the elastic force thereof. The boot 15 may be securely fixed to the boot accommodating hole 23 by an adhesive (not shown).

When a plurality of optical fibers 12 are mounted to the ferrule 11, the recess 21 communicates with the positioning mechanism 22 for each optical fiber 12 and is formed over an entire arrangement range of the plurality of optical fibers 12 in an arrangement direction of the optical fibers 12 (a vertical direction in FIG. 4). In this case, only if the adhesive 14 is applied into the single recess 21, all the optical fibers 12 can be adhered and fixed.

The recess 21 has inner walls 21a and 21b, a bottom portion 21c, and an adhesive application slot 21d, like the recess 6 of the above-described ferrule 1. Since the structure of the recess 21 and the adhesive 14, adhering and fixing of the optical fiber 12 in the recess 21 or the like, may be the same as those of the recess 6 and the adhesive 4 of the above-described ferrule 1, a description thereof will be omitted.

As shown in FIG. 6, the photoelectric conversion module 16 has an optical element 17 mounted thereon or embedded therein. Examples of the optical element 17 include a light emitting element such as a semiconductor laser (e.g., a laser diode; LD) or a light receiving element such as a photo diode (PD). The photoelectric conversion module 16 is provided on a circuit board (not shown) and has a function for driving the light emitting element based on a control signal from a driving circuit on the circuit board, and a function of delivering an electrical signal output from the light receiving element to a processing circuit on the circuit board.

The photoelectric conversion module 16 includes a holder member (not shown) for holding the ferrule 11 having the optical fiber 12 fixed thereto (a ferrule with an optical fiber 10). The structure of the holder member is not particularly limited thereto, but may be an arm supported by a spring, latch, pin engagement, magnet or the like. When the ferrule with an optical fiber 10 is held on the photoelectric conversion module 16, the lower surface 20a of the ferrule body 20 is opposite to the optical element 17. In this case, the optical fiber 12 positioned by the positioning mechanism 22 is disposed in parallel with the circuit board and so on. The positioning mechanism 22 may be in parallel with or inclined with respect to the lower surface 20a of the ferrule body 20.

The front face 20c of the ferrule body 20 is located on an extended line of an optical path 12b to which the front end face 12a of the optical fiber 12 disposed in the recess 21 is directed. A reflecting portion 24 for changing optical paths 12b and 17a between the front end of the optical fiber 12 and the optical element 17 is provided on the front face 20c. The reflecting portion 24 reflects, from its inner surface, light propagating in the ferrule body 20 based on a difference in reflective index between the ferrule body 20 and an external medium (e.g., air). A metal layer or a resin layer may be provided on the front face 20c to improve reflectance. It is preferable that the reflecting portion 24 has high reflectance.

The reflecting portion 24 may be, for example, a surface inclined with respect to a longitudinal direction of the optical fiber 12 positioned by the positioning mechanism 22 and to a direction perpendicular to the longitudinal direction. An inclination angle of the reflecting portion 24 is not particularly limited, and when the optical path 12b of optical fiber 12 is substantially perpendicular to the optical path 17a of the optical element 17 as shown in FIG. 6, the inclination angle may be about 45°.

In the embodiment shown in FIG. 6, the front face 20c of the ferrule body 20 is an inclined face formed close to the recess 21 from the lower surface 20a to the upper surface 20b to be coincident with the inclination angle of reflecting portion 24. When a plurality of optical fibers 12 are mounted to the ferrule 11, it is advantageous from a manufacturing viewpoint, e.g., a mold manufacturing cost, to make the reflecting portions 24 corresponding to the respective optical fibers 12 coplanar at the front face 20c. In the present embodiment, the front face 20c formed as the reflecting portion 24 is coplanar over an entire arrangement range of the plurality of optical fibers 12 in an arrangement direction of the optical fibers 12 (a vertical direction in FIG. 4).

When the optical element 17 is a light emitting element, the reflecting portion 24 reflects light incident from the lower surface 20a toward the front end face 12a of the optical fiber 12. On the other hand, when the optical element 17 is a light receiving element, the reflecting portion 24 reflects light output from the front end face 12a of the optical fiber 12 toward the optical element 17 through the lower surface 20a. When the optical element 17 is a composite element having a light-emitting unit and a light-receiving unit, optical connection may be performed through the reflecting portion 24 in a direction from the optical element 17 to the front end of the optical fiber 12 and a direction from the front end of the optical fiber 12 to the optical element 17.

Figure 7A:
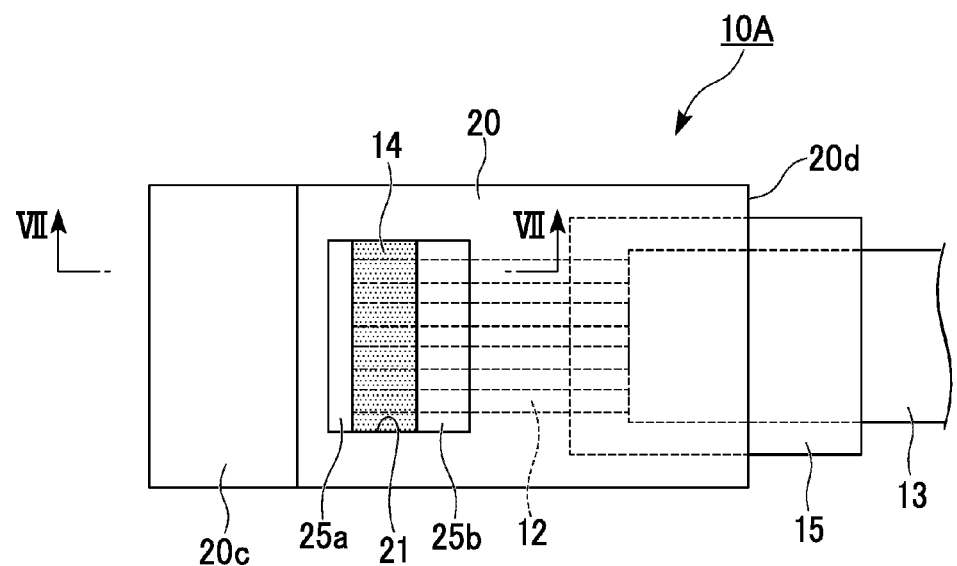
FIG. 7A is a plan view showing a ferrule in which an adhesive application slot with an inclined surface is formed in an embodiment.
Figure 7B:
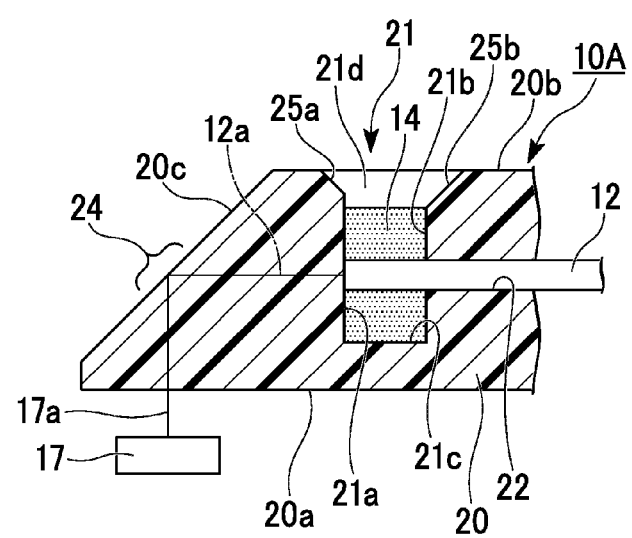
FIG. 7B is a cross-sectional view of the ferrule taken along a line VII-VII of FIG. 7A in the embodiment.

A ferrule with an optical fiber 10A shown in FIGS. 7A and 7B has inclined surfaces 25a and 25b, with an adhesive application slot 21d having an opening size increasing toward an upper surface 20b, between inner walls 21a and 21b of a recess 21 and the upper surface 20b. Accordingly, even when a distance L between the first inner wall 21b and the second inner wall 21a is small, the adhesive application slot 21d can have an increasing opening area above the recess 21. Accordingly, when the adhesive 14 is applied as drops from above the recess 21, the adhesive 14 easily enters the recess 21 through the adhesive application slot 21d. In the present embodiment, the opening size was increased in the longitudinal direction of the optical fiber 12 (a horizontal direction of the paper in FIG. 7A). When a smaller number of optical fibers 12 are arranged (there may be one optical fiber, i.e., the ferrule may be a single-core ferrule), the opening size may be increased in a direction perpendicular to the longitudinal direction of the optical fiber 12 (a vertical direction of the paper in FIG. 7A) to facilitate the application of the adhesive 14.

The inclined surfaces 25a and 25b may be provided at least one of the first inner wall 21b and the second inner wall 21a, and may be provided at both of the inner walls 21a and 21b, as shown. An inclination angle of the inclined surfaces 25a and 25b is about 45° in the shown example, but the angle is not particularly limited. For example, the angle may be 30 to 60°. When the inclined surface 25a provided in the second inner wall 21a does not reach the front face 20c with the reflecting portion 24, a flat part of the upper surface 20b is formed between the inclined surface 25a and the front face 20c, which is advantageous in terms of molding of the ferrule body 20.

An example of the structure in which the opening size of the adhesive application slot 21d is larger than the distance L between the first inner wall 21b and the second inner wall 21a includes a structure in which the above-described inclined surfaces 25a and 25b are not only formed, but also the entire inner walls 21a and 21b are curved or inclined, and the size of the recess 21 is gradually increased toward the upper surface in a tapered form. As long as the above-described requirement, L/D≤4, is satisfied, it does not matter that the recess 21 has an opening larger than four times the outer diameter D of the optical fiber 12, at a height portion above the positioning mechanism 22 in which there is no optical fiber 12.

Figure 8A:
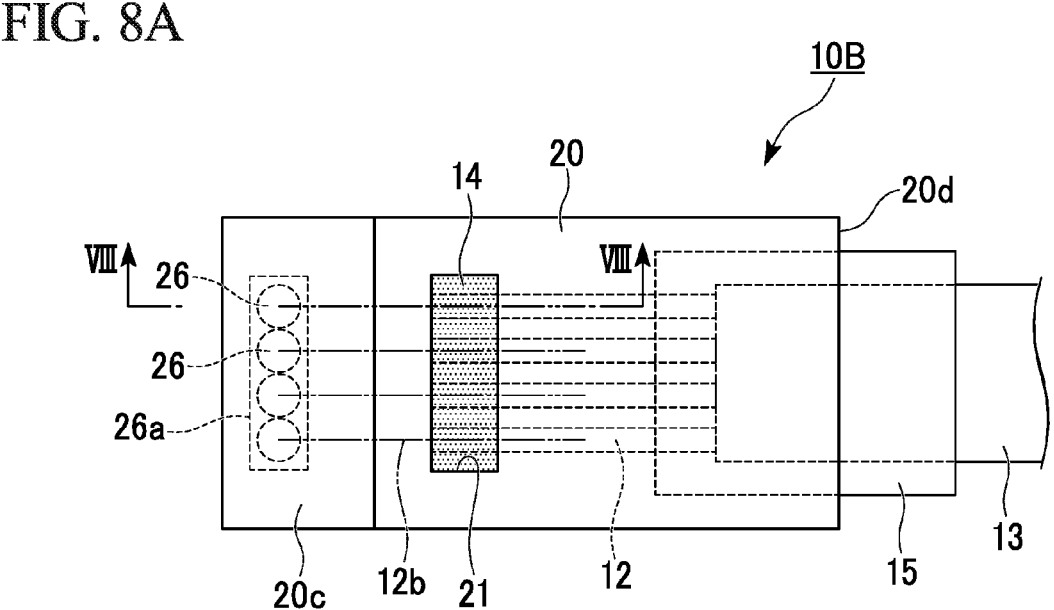
FIG. 8A is a plan view showing a ferrule with a convex lens in an embodiment.
Figure 8B:
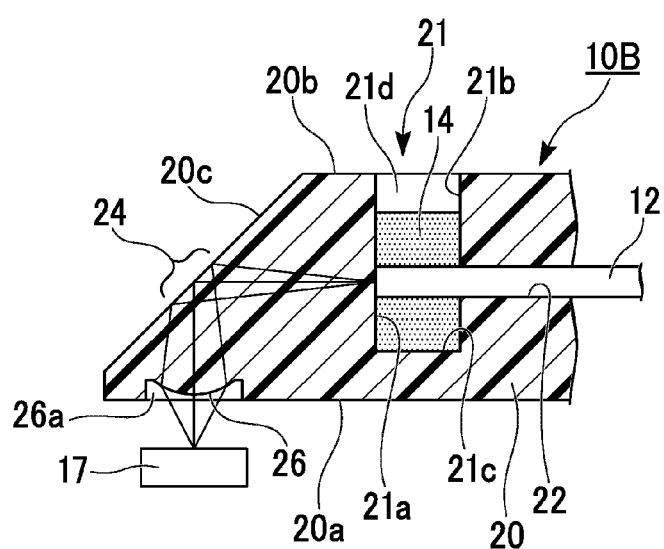
FIG. 8B is a cross-sectional view of the ferrule taken along a line VIII-VIII of FIG. 8A in the embodiment.

A ferrule with an optical fiber 10B shown in FIGS. 8A and 8B has a focusing lens 26 on a lower surface 20a of a ferrule body 20. The focusing lens 26 is, for example, a convex lens. This focusing lens 26 is disposed between a reflecting portion 24 and an optical element 17, and focuses light from the reflecting portion 24 toward the optical element 17, or vice versa (i.e., from the optical element 17 toward the reflecting portion 24) to suppress connection loss. An outer face of the ferrule body 20 may be formed in a convex shape, such that the focusing lens 26 can be integral with the ferrule body 20. Further, a lens separate from the ferrule body 20 may be fixed to the ferrule body 20.

A concave portion 26a may be formed in the lower surface 20a of the ferrule body 20 and the focusing lens 26 may be formed in the concave portion 26a to prevent the focusing lens 26 from protruding from the lower surface 20a of the ferrule body 20 downward. It is preferable that when the depth of the concave portion 26a is larger than a protrusion size of the focusing lens 26, the focusing lens 26 is accommodated inward from the lower surface 20a of the ferrule body 20 (in an upper direction of the paper in FIG. 8B).

When a plurality of optical fibers 12 are fixed to the ferrule body 20 as shown in FIG. 8A, a focusing lens 26 is provided for each of the optical fibers 12. In this case, the plurality of focusing lenses 26 are arranged in an arrangement direction of the optical fibers 12. The concave portion 26a may be provided for each focusing lens 26, or may be formed so that the plurality of focusing lenses 26 are disposed in one concave portion 26a as illustrated in FIG. 8A. The concave portion 26a may be a groove portion that is formed in a rectangular shape on the lower surface 20a.

Figure 9A:
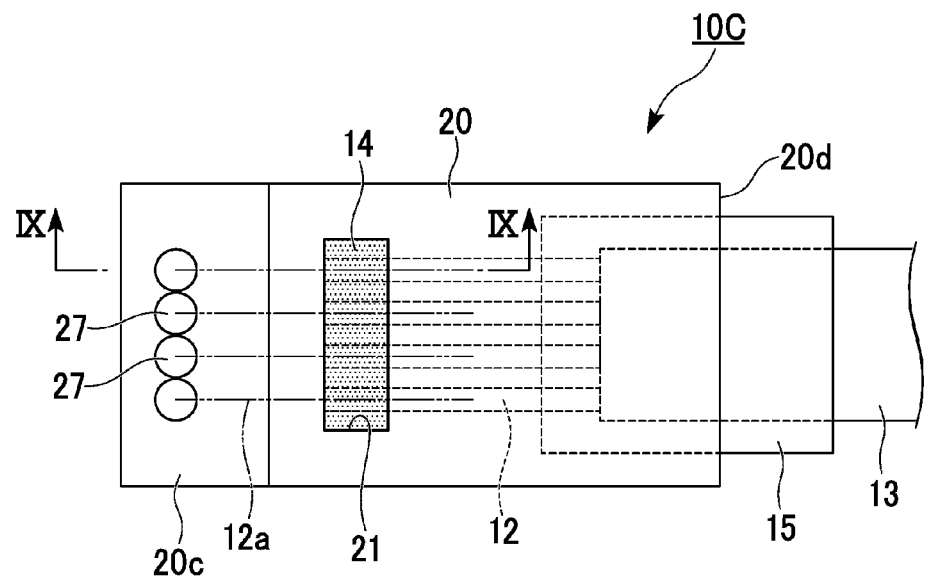
FIG. 9A is a plan view showing a ferrule with a recessed reflecting surface in an embodiment.
Figure 9B:
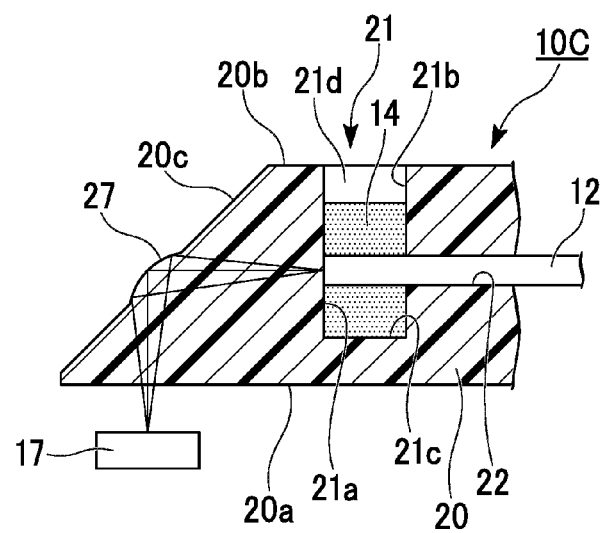
FIG. 9B is a cross-sectional view of the ferrule taken along a line IX-IX of FIG. 9A in the embodiment.

A ferrule with an optical fiber 10C shown in FIGS. 9A and 9B has a reflecting portion 27 with a curved surface provided on a front face 20c of a ferrule body 20. The reflecting portion 27 may be, for example, a recessed reflecting surface and may be a spherical surface or a non-spherical surface. This reflecting portion 27 is located between a front end of the optical fiber 12 and an optical element 17, and functions as a concave mirror with respect to the front end of the optical fiber 12 and the optical element 17.

Accordingly, it is possible to focus light between the optical fiber 12 and the optical element 17 and suppress connection loss. That is, when the optical element 17 is a light emitting element, the reflecting portion 27 focuses, toward the front end of the optical fiber 12, light emitted from the optical element 17 to the reflecting portion 27. On the other hand, when the optical element 17 is a light receiving element, the reflecting portion 27 focuses, toward the optical element 17, light emitted from the front end of the optical fiber 12 to the reflecting portion 27.

A focal point of the reflecting portion 27 may be located on the front end face 12a of the optical fiber 12, on a light-emitting face of the optical element 17, or on a light-receiving face of the optical element 17, with a small deviation allowed.

The reflecting portion 27 reflects light propagating inside the ferrule body 20 from its inner surface based on a difference in reflective index between the ferrule body 20 and an external medium (e.g., air). Further, a metal layer or a resin layer may be provided on the front face 20c to improve reflectance. It is preferable that the reflecting portion 27 has high reflectance. The reflecting portion 27 may have a concave shape, when viewed from light reflected by the inner surface thereof. That is, the ferrule body 20 may be formed integrally with the reflecting portion 27 so that the front face 20c of the ferrule body 20 has a convex shape, when viewed from the outside. Further, a concave mirror which is separate from the ferrule body 20 may be fixed to the ferrule body 20.

When a plurality of optical fibers 12 are fixed to the ferrule body 20 as shown in FIG. 9A, the reflecting portion 27 is provided to each optical fiber 12 and the plurality of reflecting portions 27 are arranged in an arrangement direction of the optical fibers 12.

A positioning mechanism 22 may be an optical fiber hole 22a entirely surrounding the optical fiber 12, as shown in FIG. 10A. When a through hole with a small diameter, such as the optical fiber hole 22a, is formed in a integral mold, a pin-shaped mold is disposed in the position of the optical fiber hole upon molding the ferrule body 20 to prevent the inflow of material, such that the optical fiber hole can be formed simultaneously with molding of the ferrule body 20. Since this technique can easily form a high-precision optical fiber hole 22a in comparison with post-processing using, for example, a drill, the technique is particularly suitable for a multi-core ferrule 11 with a plurality of optical fiber holes 22a.

The V-shaped groove 22b shown in FIG. 10B, the U-shaped groove 22c shown in FIG. 10C or the like may be employed as the positioning mechanism 22.

In this case, as shown in FIG. 11, a ferrule body 28 having an optical fiber-accommodating groove such as the V-shaped groove 22b or the U-shaped groove may be covered with a pressing lid 29 formed as a plate-shaped member, and the optical fibers 12 may be adhered and fixed between the ferrule body 28 and the pressing lid 29.

While the preferred embodiments of the present invention have been described, the present invention is not limited to the above-described embodiments and variations may be made to the present invention without departing from the scope of the present invention.

While in FIGS. 6 to 9B, the reflecting portion 24 or 27 of the ferrule body 20 is formed on the front face 20c that is an outer face of the ferrule body 20, the present invention is not limited thereto. The reflecting portion may be formed inside the ferrule body 20. For example, a concave portion having a cross-sectional surface of a V-shape may be formed from the upper surface 20b of the ferrule body between the front face 20c of the ferrule body 20 and the recess 21, and used as the reflecting surface. Alternatively, a thin metal piece, as a reflecting mirror, may be implanted in the ferrule body to form the reflecting portion.

EXAMPLES

Hereinafter, an example of the present invention will be described in detail. The present invention is not limited to the examples.

Figure 12A:
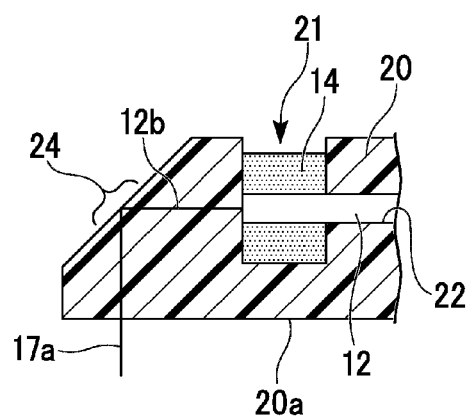
FIG. 12A is a cross-sectional view showing an example of a state of an optical connection using the ferrule in the example.
Figure 12B:
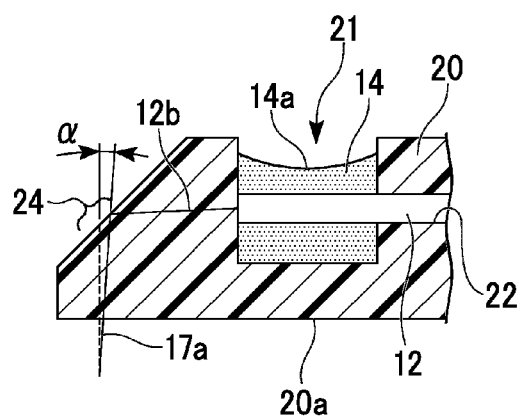
FIG. 12B is a cross-sectional view showing an example of a state of an optical connection using the ferrule in the comparative example.

In this example, a multi-core (12-core) tape-shaped optical fiber core wire with a silica optical fiber having an outer diameter of 0.125 mm was used as an optical fiber. The ferrule body 20 having the structure in which the front end portion of the optical fiber 12 is fixed in the recess 21 by the adhesive 14, and the directions of the optical paths 12b and 17a are changed 90° by the reflecting portion 24 formed as a flat face on the front face of the ferrule body 20 to optically connect the optical fiber 12 with the optical element 17, as shown in FIGS. 12A and 12B, was used as a ferrule. An optical fiber hole having an inner diameter of 0.127 mm was used as the positioning mechanism 22 of the ferrule.

The distance L between the first inner wall 21b and the second inner wall 21a of the recess 21 in each sample was designed so that L/D was 0.5, 1, 2, 3, 4, 5 and 6, and these seven types of samples were manufactured, the number of the respective manufactured samples being about 30, as shown in Table 1. 12 optical fiber holes were formed in one ferrule to position and fix 12 optical fibers.

For each optical fiber, a beam angle α with respect to a reference direction perpendicular to the lower surface 20a as shown in FIG. 12B was measured. Here, the reference direction corresponds to an optical axial direction of the optical element 17 when the optical element 17 is optically connected to the optical fiber. The beam angle α corresponds to a beam angle with respect to the optical axial direction of the optical element 17. In this example, the beam angle α is obtained by measuring an angle when light output from the optical fiber 12 is reflected and output by the reflecting portion 24, as an angle deviating from the reference direction. When the front end portion of the optical fiber 12 is moved, for example, due to the shrinkage 14a of the adhesive 14, the optical path 12b deviates from a regular direction and the beam angle α increases.

Figure 13:
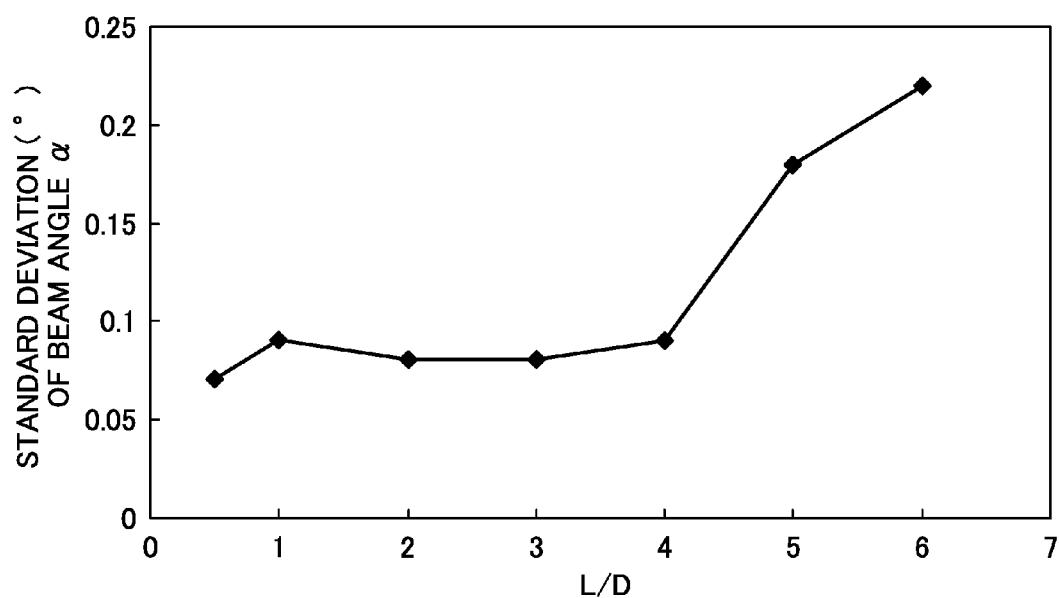
FIG. 13 is a graph showing an example of the result of measuring a standard deviation of a beam angle α according to the embodiment.

For about 30 ferrules with L/D=0.5, L/D=1, L/D=2, L/D=3, L/D=4, L/D=5, and L/D=6 and about 360 optical fibers, beam angles α were measured. For each L/D, a standard deviation of the beam angle α of each 12-core optical fiber was calculated and averaged to obtain a standard deviation of the beam angle α for each L/D. The result is shown in Table 1. In FIG. 13, the result of Table 1 is shown by a graph.

TABLE 1

| L/D | Standard deviation (°) of beam angle α |
|---|---|
| 0.5 | 0.07 |
| 1 | 0.09 |
| 2 | 0.08 |
| 3 | 0.08 |
| 4 | 0.09 |

TABLE 1-continued

| L/D | Standard deviation (°) of beam angle α |
|---|---|
| 5 | 0.18 |
| 6 | 0.22 |

As shown in Table 1 and FIG. 13, when the distance L between the inner walls 21a and 21b of the recess 21 is designed so that L/D≤4, the standard deviation of the beam angle α was decreased. On the other hand, when L/D is 5 or more, the standard deviation of the beam angle α was greatly increased. It has been found from this result that when L/D≤4, a ferrule with small connection loss can be manufactured with a higher yield.

What is claimed is:

1. A ferrule for optically connecting an optical fiber to an optical part, the ferrule comprising:
    a boot accommodating hole which is configured to accommodate a boot attached to the optical fiber and which is formed on a rear end surface of the ferrule;
    an optical fiber hole which is configured to position an intermediate portion of the optical fiber having an outer diameter and which extends forward from a front end of the boot accommodating hole; and
    a recess configured for an adhesive to be disposed therein and comprising a first inner wall from which a front end of the optical fiber positioned by the optical fiber hole is protrudable, and a second inner wall opposite to the first inner wall, wherein:
    the second inner wall is configured to be abutted by almost an entire area of a front end surface of the optical fiber;
    a bottom of the recess is positioned lower than a lower edge of the front end of the optical fiber that protrudes from the first inner wall;
    the recess comprises an adhesive application slot with an opening larger than a distance between the first inner wall and the second inner wall, the first inner wall comprising a first inclined surface, and the second inner wall comprising a second inclined surface which does not reach a front face of the ferrule; and
    the distance between the first inner wall and the second inner wall is greater than or equal to half of the outer diameter of the optical fiber and less than or equal to four times the outer diameter of the optical fiber,
    wherein the ferrule further comprises further comprises a reflecting portion reflecting light on an optical path between the front end of the optical fiber positioned by the optical fiber hole and the optical part,
    wherein a plurality of the optical fibers is fixed, and the reflecting portion comprises a recessed reflecting surface and is provided to each of the plurality of the optical fibers, and
    wherein a plurality of the reflecting portions is arranged in an arrangement direction of the plurality of the optical fibers.

2. The ferrule according to claim 1, wherein the ferrule is formed of a resin that is transparent to a wavelength of light transmitted through the optical fiber.

3. A ferrule for optically connecting an optical fiber to an optical part, the ferrule comprising:
    a boot accommodating hole which is configured to accommodate a boot attached to the optical fiber and which is formed on a rear end surface of the ferrule;
    an optical fiber hole which is configured to position an intermediate portion of the optical fiber having an outer diameter and which extends forward from a front end of the boot accommodating hole; and a recess configured for an adhesive to be disposed therein and comprising a first inner wall from which a front end of the optical fiber positioned by the optical fiber hole is protrudable, and a second inner wall opposite to the first inner wall, wherein:

the second inner wall is configured to be abutted by almost an entire area of a front end surface of the optical fiber;

a bottom of the recess is positioned lower than a lower edge of the front end of the optical fiber that protrudes from the first inner wall;

the recess comprises an adhesive application slot with an opening larger than a distance between the first inner wall and the second inner wall, the first inner wall comprising a first inclined surface, and the second inner wall comprising a second inclined surface which does not reach a front face of the ferrule;

the distance between the first inner wall and the second inner wall is greater than or equal to half of the outer diameter of the optical fiber and less than or equal to four times the outer diameter of the optical fiber, and wherein the ferrule further comprises a lens located on an extension line of the optical fiber.

4. An optical connector for optically connecting an optical fiber to an optical part, the optical connector comprising:

an optical fiber; and a ferrule comprising:

a boot accommodating hole which is configured to accommodate a boot attached to the optical fiber and which is formed on a rear end surface of the ferrule;

an optical fiber hole which is configured to position at least an intermediate portion of the optical fiber and which extends forward from a front end of the boot accommodating hole;

a recess comprising a first inner wall from which a front end of the optical fiber protrudes, and a second inner wall opposite to the first inner wall; and an adhesive disposed in the recess and a surrounding portion of the optical fiber protruding from the first inner wall, wherein:

a bottom of the recess is positioned lower than a lower edge of the front end of the optical fiber that protrudes from the first inner wall;

the recess comprises an adhesive application slot with an opening larger than a distance between the first inner wall and the second inner wall, the first inner wall comprising a first inclined surface, and the second inner wall comprising a second inclined surface which does not reach a front face of the ferrule;

the distance between the first inner wall and the second inner wall is greater than or equal to half of an outer diameter of the optical fiber and less than or equal to four times the outer diameter of the optical fiber; and substantially an entire area of a front end surface of the optical fiber abuts the second inner wall, wherein the ferrule further comprises a lens located on an extension line of the optical fiber.

* * * * *